United States Patent

[11] 3,591,291

| [72] | Inventors | Milton Greer<br>Ypsilanti;<br>Irvin W. Kay, Ann Arbor; Kenneth R.<br>Morris, Ann Arbor, all of, Mich. |
|---|---|---|
| [21] | Appl. No. | 827,599 |
| [22] | Filed | May 26, 1969 |
| [45] | Patented | July 6, 1971 |
| [73] | Assignee | Conductron Corporation<br>St. Charles, Mo. |

[54] METHOD AND APPARATUS FOR SENSING REFLECTED LIGHT AND DIFFUSED LIGHT FROM A SURFACE TO INDICATE THE ROUGHNESS OF SAID SURFACE
3 Claims, 12 Drawing Figs.

[52] U.S. Cl................................................. 356/120,
356/199, 356/209, 356/212, 356/237
[51] Int. Cl..........................................................G01b 11/30,
G01n 21/48, G01n 21/16
[50] Field of Search........................................... 356/120,
199, 200, 209, 210, 212, 237

[56] References Cited
UNITED STATES PATENTS

| 1,917,379 | 7/1933 | Lowry | 356/212 X |
| 1,949,619 | 3/1934 | Pfund | 356/212 X |
| 2,315,282 | 3/1943 | Snow | 356/210 |
| 2,446,628 | 8/1948 | Brown | 356/120 X |
| 3,229,564 | 1/1966 | Meltzer | 356/210 |

*Primary Examiner*—Ronald L. Wibert
*Assistant Examiner*—Warren A. Sklar
*Attorney*—Kingsland, Rogers, Ezell, Eilers & Robbins

ABSTRACT: The roughness of a relatively smooth surface is measured by directing a collimated beam of light against that surface, by disposing one light-sensitive element at the angle of reflection, by spacing further light-sensitive elements away from the angle of reflection, and by comparing the signal developed by that one light-sensitive element with the signals developed by those further light-sensitive elements.

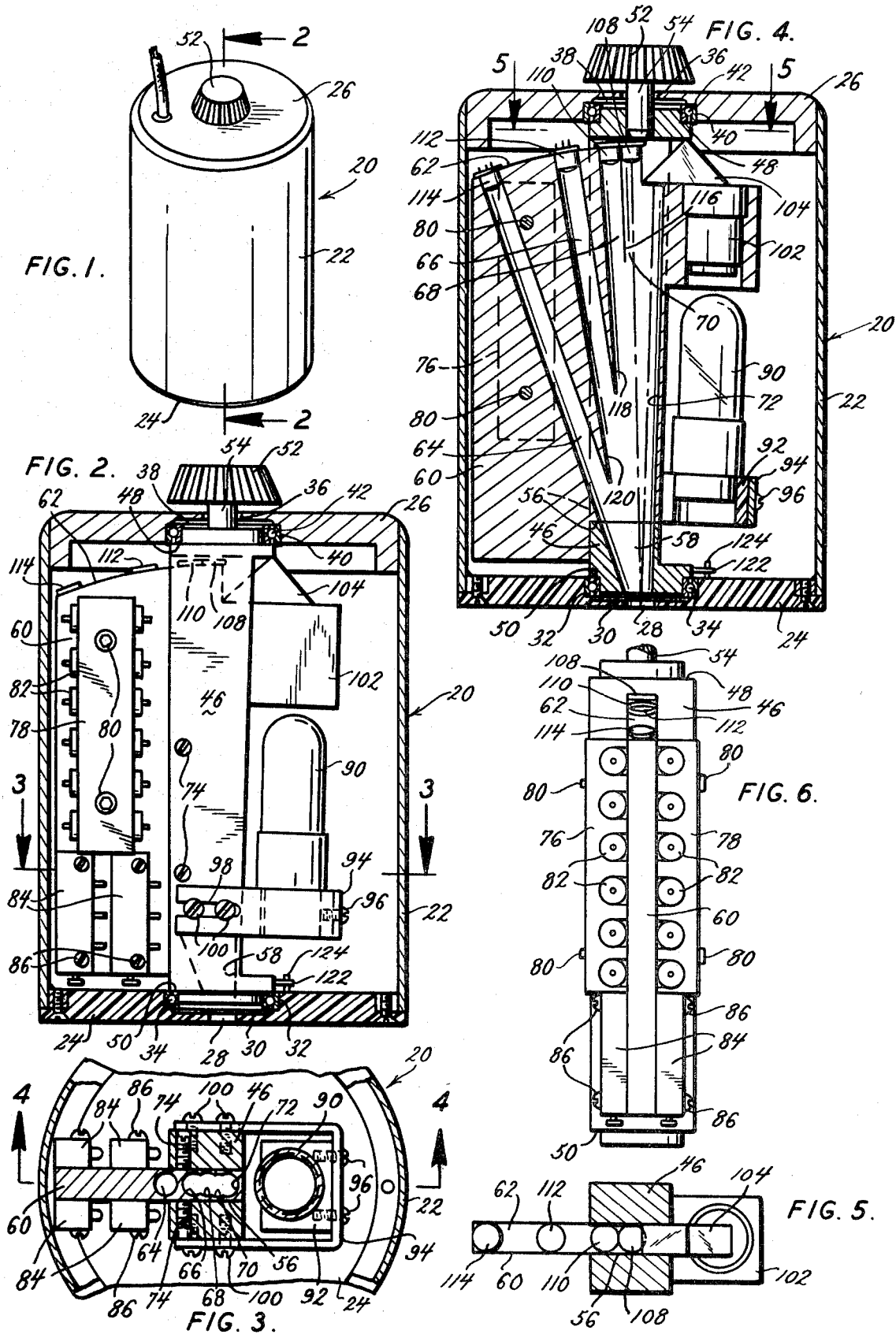

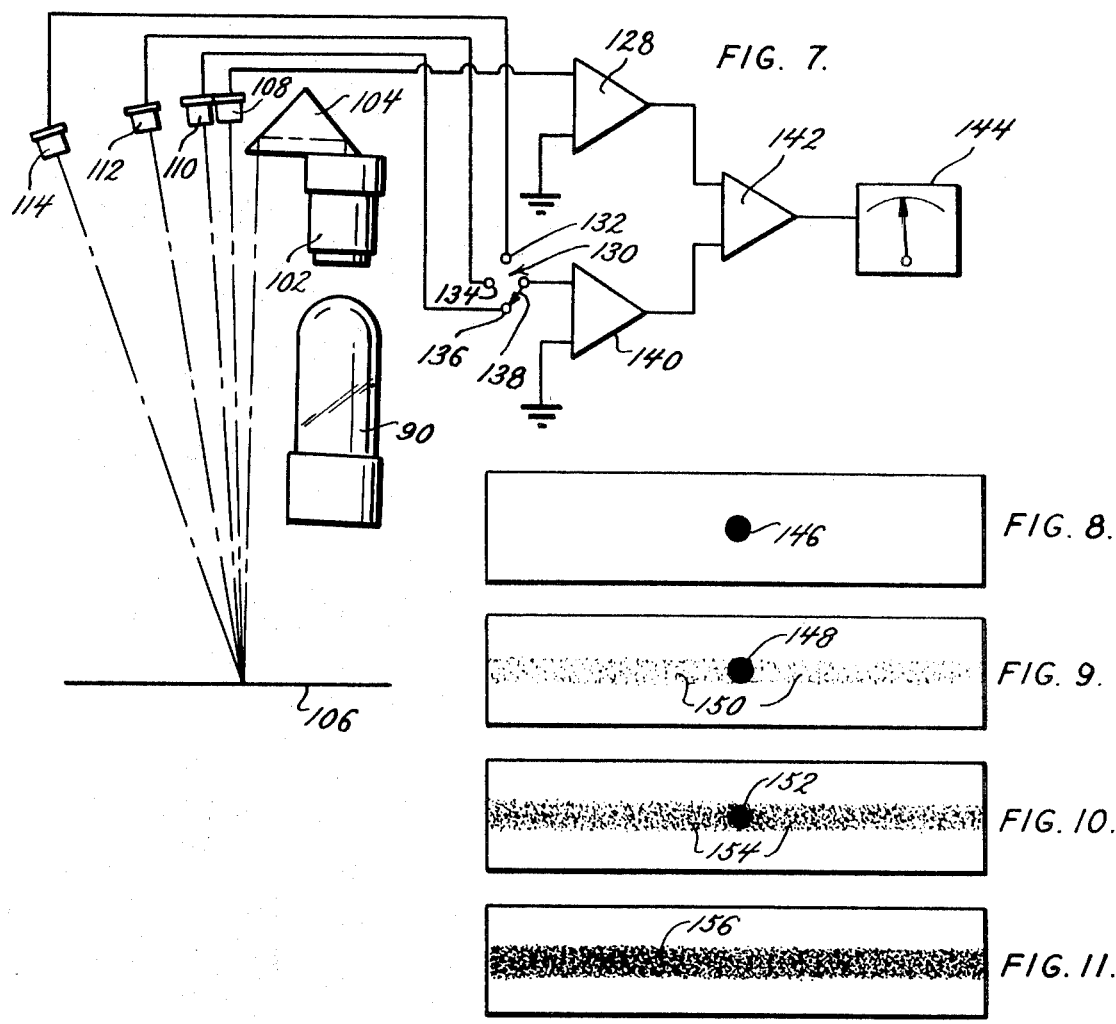
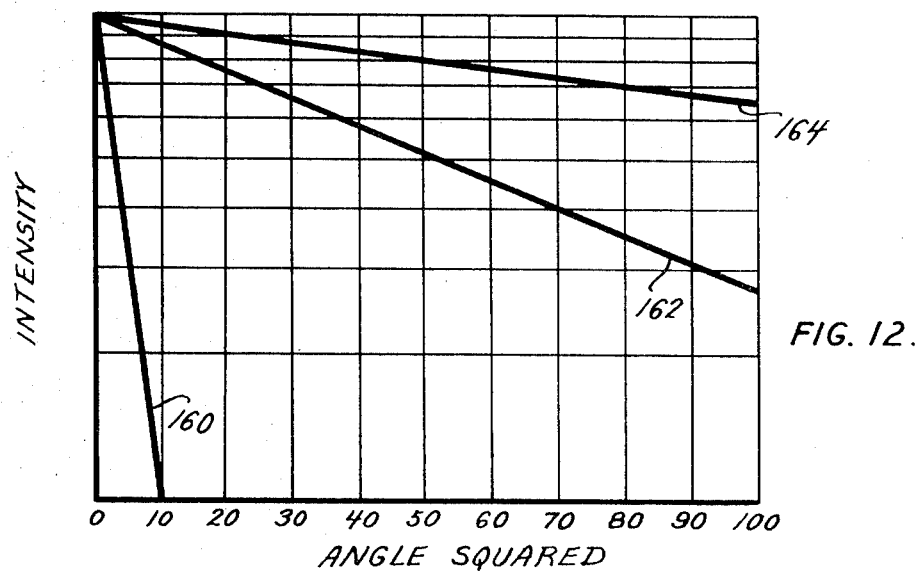

METHOD AND APPARATUS FOR SENSING REFLECTED LIGHT AND DIFFUSED LIGHT FROM A SURFACE TO INDICATE THE ROUGHNESS OF SAID SURFACE

This invention relates to improvements in control systems. More particularly, this invention relates to improvements in methods and apparatus for measuring the roughness of relatively smooth surfaces.

It is, therefore, an object of the present invention to provide an improved method and apparatus for measuring the roughness of relatively smooth surfaces.

It frequently is desirable to measure the roughness of relatively smooth surfaces; and one method of measure the roughness of such surfaces utilizes a stylus-type instrument. However, the use of a stylus-type instrument is not desirable; because such an instrument cannot provide a very accurate measurement of the roughness of relatively smooth surfaces, and because such an instrument can impair or destroy relatively smooth surfaces. Another method of measuring the roughness of relatively smooth surfaces utilizes a microfinish surface comparator. While a microfinish surface comparator can provide a visual comparison between a test surface and a standard surface, a microfinish surface comparator cannot provide quantitative measurements. Consequently, it would be desirable to provide a device which could provide quantitative measurements of the roughness of relatively smooth surfaces and which would not impair or destroy those surfaces. The present invention provides such a device; and it is, therefore, an object of the present invention to provide a device which can provide quantitative measurements of the roughness of relatively smooth surfaces and which will not impair or destroy those surfaces.

The device provided by the present invention directs a collimated beam of light toward a relatively smooth surface to be tested; and one light-sensitive element is disposed at the angle at which light would be reflected from that surface if that surface was perfectly smooth. Further light-sensitive elements are spaced from the one light-sensitive element to receive light which is diffused or scattered by any "peaks" on the relatively smooth surface. The signal developed by the one light-sensitive element is compared with the signals developed by the further light-sensitive elements to provide a quantitative measurement of the roughness of the relatively smooth surface. It is, therefore, an object of the present invention to provide a device which directs a collimated beam of light against a relatively smooth surface to be tested, which disposes one light-sensitive element at the angle of reflection, which spaces further light-sensitive elements from that one light-sensitive element, and which compares the signal developed by that one light-sensitive element with the signals developed by those further light-sensitive elements to provide a quantitative measurement of the roughness of the relatively smooth surface.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing:

FIG. 1 is a perspective view of one preferred embodiment of device for measuring the roughness of relatively smooth surfaces, FIG. 2 is a sectional view, on a larger scale, through the device of FIG. 1, and it is taken along the plane indicated by the line 2—2 in FIG. 1, FIG. 3 is a broken sectional view, on the scale of FIG. 2, through the device of FIG. 1, and it is taken along the plane indicated by the line 3—3 in FIG. 2, FIG. 4 is a sectional view, on the scale of FIG. 2, through the device of FIG. 1, and it is taken along the plane indicated by the line 4—4 in FIG. 3, FIG. 5 is a further sectional view, on the scale of FIG. 2, through the device of FIG. 1, and it is taken along the plane indicated by the line 5—5 in FIG. 4, FIG. 6 is an elevational view, on a still larger scale, of the movable element in the device of FIG. 1, FIG. 7 is conceptual diagram of the circuit of the device shown in FIG. 1, FIG. 8 is a view of a spot of light reflected from a mirror, FIG. 9 is a view of light reflected from a one-directional lay surface which has peaks with heights averaging two-millionths of an inch, FIG. 10 is a view showing light reflected from a one-directional lay surface which has peaks with heights averaging five-millionths of an inch, FIG. 11 is a view of light reflected from a one-directional lay surface which has peaks with heights averaging ten-millionths of an inch, and FIG. 12 is a graph showing lines corresponding to different degrees of roughness.

Referring to the drawing in detail, to numeral 20 generally denotes the housing for one preferred embodiment of roughness-measuring device that is made in accordance with the principles and the teachings of the present invention. That housing includes a cylindrical wall 22, a bottom 24, and a top 26. The bottom 24 has a circular opening 28 in the center thereof; and it has a shallow, circular recess 30 surrounding, and contiguous with, the opening 28. A further shallow, circular recess 32 surrounds, and is contiguous with, the shallow, circular recess 30; and that further shallow, circular recess receives the outer race of an antifriction bearing 34.

The top 26 has a circular opening 36 in the center thereof; and it has a shallow, circular recess 38 surrounding, and contiguous with, the opening 36. A further shallow, circular recess 40 surrounds, and is contiguous with the shallow circular recess 38; and that further shallow, circular recess receives the outer race of an antifriction bearing 42. The opening 36 in the top 26 and the opening 28 in the bottom 24 are coaxial; and so are the shallow, circular recesses 30 and 38, the further shallow, circular recesses 32 and 40, and the outer races of the bearings 34 and 42.

The numeral 46 denotes a rotor which has a shallow, circular, annular recess 48 adjacent the upper end thereof that accommodates the inner race of the bearing 42; and that rotor has a shallow, circular, annular recess 50 adjacent the lower end thereof which accommodates the inner race of the bearing 34. A short, stub shaft 54 is pressed into a cylindrical opening in the upper end of the rotor 46; and that short, stub shaft extends upwardly from that rotor and through the opening 36 in the top 26. A knob 52 is suitably secured to the short, stub shaft 54 to rotate the rotor 46.

The rotor 46 is rectangular in cross section, as shown by FIGS. 3 and 5; and it has a vertically directed slot 56 therein. The rotor 46 also has a generally frustotriangular passage 58 in the bottom thereof; and that passage is contiguous with the slot 56, and is in register with the opening 28 in the bottom 24, as shown by FIG. 4.

The numeral 60 denotes a light-directing block which is generally rectangular in configuration but which has an arcuate upper surface 62. That light-directing block has a passage 64 therein, a passage 66 therein, a passage 68 therein, and a passage 70 therein; and those passages are inclined relative to each other. The lower ends of the passages 64, 66, 68 and 70 merge together, and also merge with the lower end of a further passage 72 in the light-directing block 60. The right-hand portion of the light-directing block is disposes within the slot 56 in the rotor 46; and that light-directing block is fixedly secured to that rotor by screws 74. The lower ends of the passages 64, 66, 68, 70 and 72 in the light-directing block are contiguous with, and merge into, the passage 58 in the bottom of the rotor 46; and the axes of the passages 64, 66, 68, 70 and 72 intersect at a point which is in the approximate center of the opening 28 and which lies in the plane of the bottom surface of the bottom 24.

The numerals 76 and 78 denote brackets which are secured to the opposite faces of the left-hand portion of the light-directing block 60 by bolt and nut combinations 80; and those brackets hold electrical components 82 in position adjacent that light-directing block. Those electrical components could be resistors, capacitors, or the like. The numeral 84 denotes adjustable potentiometers which are secured to the opposite faces of the left-hand portion of the light-directing block 60 by screws 86.

The numeral 90 denotes a light source which fits into a socket 92; screws 96 secure that socket to the closed end of a generally U-shaped bracket 94. Slots 98 in the arms of the generally U-shaped bracket 94 telescope over the shanks of screws 100 which are supported by the rotor 46; and loosening and tightening of those screws will permit adjustment of the position of the light source 90 relative to that rotor—and thus relative to the light-directing block 60. That light source preferably is a small, stable, flicker-free light source which produces a light beam that is no greater than 8 millimeters in diameter but that has a brightness of at least 500 foot-candles.

The numeral 102 denotes a lens system which receives the light beam from the light source 90 and which focuses and collimates that light beam. While different lens systems could be used as the lens system 102, a microscope objective has been found to be useful, readily obtainable, and relatively inexpensive. The lens system 102 is secured to the rotor 46 above, and essentially in alignment with, the light source 90.

The numeral 104 denotes a prism which is secured to the rotor 46 above the level of the lens system 102, as shown particularly by FIGS. 2 and 4. The right-hand end of that prism is in register with the axis of that lens system, while the left-hand end of that prism is in register with the axis of the passage 72 in the light-directing block 60. As indicated by dash-dot lines in FIGS. 4 and 7, the prism 104 receives a narrow collimated beam of light from the lens system 102, internally reflects that beam of light twice, and then directs that beam of light downwardly through, and along the axis of, the passage 72 in the light-directing block 60. The beam of light from the prism 104 will pass through the opening 38 in the bottom 24 and will strike the surface 106 on which the roughness-measuring device is set; and some of the light from that light beam will be reflected upwardly through, and along the axis of, the passage 70 in the light-directing block 60. The angle of incidence of that light beam will preferably be 2°; and hence the angle of reflection of that light beam will preferably be 2°.

The numeral 108 denotes a light-sensitive element which is mounted on, and rotatable with, the light-directing block 60; and that light-sensitive element is disposed at the upper end of, and is coaxial with, the passage 70 in that light-directing block. The numeral 110 denotes a second light-sensitive element which is mounted on, and rotatable with, the light-directing block 60; and that second light-sensitive element is disposed at the upper end of, and is coaxial with, the passage 68 in that light-directing block. A relatively short partition 116 separates the upper end of the passage 70 from the upper end of the passage 68; and that partition will tend to keep light, which is intended to pass upwardly through the passage 70 and to reach the light-sensitive element 108 from passing upwardly through the passage 68 and reaching the light-sensitive element 110. Also, that short partition will tend to keep light, which is intended to pass upwardly through the passage 68 and to reach the light-sensitive element 110 from passing upwardly through the passage 70 and reaching the light-sensitive element 108. The numeral 112 denotes a third light-sensitive element which is mounted on, and rotatable with, the light-directing block 60; and that third light-sensitive element is disposed at the upper end of, and is coaxial with, the passage 66 in that light-directing block. A partition 118, which is longer and wider than the partition 116, separates the upper end of the passage 66 from the upper end of the passage 68; and that partition will tend to keep light, which is intended to pass upwardly through the passage 66 and to reach the light-sensitive element 112, from passing upwardly through the passage 68 and reaching the light-sensitive element 110. Also, that partition will tend to keep light, which is intended to pass upwardly through the passage 68 and to reach the light-sensitive element 110 from passing upwardly through the passage 66 and reaching the light-sensitive element 112. The numeral 114 denotes a fourth light-sensitive element that is mounted on, and rotatable with, the light-directing block 60; and that fourth light-sensitive element is disposed at the upper end of, and is coaxial with, the passage 64 in that light-directing block. Each of the light-sensitive elements 108, 110, 112 and 114 is suitably secured to the arcuate upper edge 62 of the light-directing block 60. A partition 120, which is longer and wider than the partition 118, separates the upper end of the passage 64 from the upper end of the passage 66; and that partition will tend to keep light, which is intended to pass upwardly through the passage 64 and to reach the light-sensitive element 114 from passing upwardly through the passage 66 and reaching the light-sensitive element 112. Also, that partition will tend to keep light which is intended to pass upwardly through the passage 66 and to reach the light-sensitive element 112 from passing upwardly through the passage 64 and reaching the light-sensitive element 114. The partitions 116, 118 and 120 will be formed as the light-directing block 60 is drilled to form the passages 64, 66, 68 and 70.

The passages 64, 66, 68 and 70 can be given different lengths; but, in the said one preferred embodiment of roughness-measuring device provided by the present invention, each of those passages is just long enough to enable the light-sensitive element at the upper end thereof to intercept a cone of light which has an angle of generation of 1°. The angular spacings between the axes of the passages 64, 66, 68 and 70 could be varied, but, in the said one preferred embodiment of roughness-measuring device provided by the present invention, the angular spacing between the axes of the passages 70 and 68 is 1° or less, the angular spacing between the axes of the passages 70 and 66 is between 10° and 5°, and the angular spacing between the axes of the passages 70 and 64 is between 30° and 2°.

Different light-sensitive elements could be used as the light-sensitive elements 108, 110, 112 and 114, but light-sensitive field effect transistors have been found to be very useful. In the said one preferred embodiment of roughness-measuring device provided by the present invention, Siliconix 0P238 PhotoFET light-sensitive field effect transistors are used as the light-sensitive elements 108, 110, 112 and 114. When smaller diameter, stable, light-sensitive elements become commercially available, those light-sensitive elements should be used; because the smaller the diameters of the light-sensitive elements, the greater the ability of the roughness-measuring device to sense differing degrees of roughness.

The light-directing block 60, the light-sensitive elements 108, 110, 112 and 114 which are secured to the arcuate upper surface 62 of that light-directing block, and the electrical components 82 and the adjustable potentiometers 84 which are secured to the opposite faces of that light-directing block will rotate as a unit with rotor 46. Also, the U-shpaed bracket 94, the base 92, the light source 90, the lens system 102, and the prism 104 will rotate as a unit with the rotor 46. As a result, rotation of the knob 52 will effect rotation of all of the elements within the housing 20.

The numeral 122 denotes a pin which is secured to, and which projects horizontally outwardly from, the lower end of the rotor 46, as shown particularly by FIGS. 2 and 4. A pinlike stop 124 is secured to, and extends upwardly from, the base 24; and that stop is in the path of the pin 122. That stop and that pin permit the knob 52 to rotate the rotor 46 approximately 359° in the clockwise direction and back again, and thus permit the light-sensitive elements 108, 110, 112 and 114 to be set in any desired position relative to the surface 106. However, the stop 124 and the pin 122 will keep the knob 52 from rotating the rotor 46 far enough to injure the flexible conductors which are connected to the light source 90 and to the light-sensitive elements 108, 110, 112 and 114.

Referring particularly to FIG. 7 the numeral 128 denotes a log amplifier; and that log amplifier has one of the inputs thereof grounded and has the other input thereof connected to the output of the light-sensitive element 108. The numeral 130 denotes a selector switch which has fixed contacts 132, 134 and 136 and which has a movable contact 138. The fixed contact 132 is connected to the output of light-sensitive element 108. The numeral 130 denotes a selector switch which has fixed contacts 132, 134 and 136 and which has a movable contact 138. The fixed contact 132 is connected to the output of light-sensitive element 114, the fixed contact 134 is connected to the output of light-sensitive element 112, and the fixed contact 136 is connected to the output of the light-sensitive element 110. The movable contact 138 is connected to one input of a log amplifier 140, and the other input of that log amplifier is grounded. The outputs of the log amplifiers 128 and 140 are connected to the two inputs of a differential amplifier 142; and the output of that differential amplifier is connected to a meter 144. While different amplifiers could be used as the log amplifiers could be used as the log amplifiers 128 and 140, the said one preferred embodiment of roughness-measuring device provided by the present invention uses Model 0183J amplifiers of the Analog Devices Company as the log amplifiers 128 and 140. While different amplifiers could be used as the differential amplifier 142, the said one preferred embodiment of roughness-measuring device provided by the present invention, uses a μA 741 amplifier of the Fairchild Corporation as the differential amplifier 142.

The light beam from the light source 90 will be focused and collimated by the lens system 102 to form a narrow, collimated light beam of circular cross section; and that light beam will enter the prism 104, will be reflected twice within that prism, and then will be directed downwardly through the opening 28 in the base 24 and onto the surface 106, to be tested. That beam of light will strike the surface 106 at an incidence angle of 2°; and, if that surface is perfectly smooth, light will be reflected from that surface in the form of a beam of light which is circular in cross section and which will leave that surface at a reflection angle of 2°. As a result, that beam of light will move through, and parallel to the axis of, the passage 70 and reach the light-sensitive element 108. The light which the light-sensitive element 108 will receive from a perfectly smooth surface 106 will be in the form of a bright beam of light 146 of circular cross section, as shown by FIG. 8.

If the surface 106 is not perfectly smooth and, instead, has minute peaks and valleys, the beam of light which passes downwardly through the opening 28 in the base 24 and strikes that surface will not be reflected from that surface in the form of a narrow beam of circular cross section. Instead, part of that light will become diffused and diffracted; and, if the surface 106 is a one-directional lay surface, that part of the light will tend to define an elongated pattern. If the peaks of the surface 106 are quite short—having an average height of two-millionths of an inch—the diffusing and diffracting of the light which is caused by those peaks will be very moderate, and most of the light which is reflected from that surface will form a narrow light beam of circular cross section. Thus, as shown particularly by FIG. 9, most of the light that is reflected from a surface which has peaks with average heights of two-millionths of an inch will form a beam of light 148 of circular cross section. However, the diffracting and diffusing action of the peaks on such a surface will cause some of the light from that surface to produce an elongated pattern 150 which extends outwardly from the opposite sides of the beam of light 148, as shown particularly by FIG. 9. The light-sensitive element 108 will essentially "see" only the beam of light 148, the light-sensitive element 110 will "see" the portion of the elongated pattern 150 which is immediately adjacent the left-hand side of that beam of light, the light-sensitive element 112 will "see" the portion of the elongated pattern 150 which is disposed to the left of that portion of that elongated pattern which is "seen" by the light-sensitive element 110, and the light-sensitive element 114 will "see" the portion of the elongated pattern 150 which is disposed to the left of that portion of that elongated pattern which is "seen" by the light-sensitive element 112.

If the surface 106 is a one-directional lay surface, and if the peaks on that surface have average heights in the range of five-millionths of an inch, the diffusing and diffracting of the light which is caused by those peaks will be greater than the diffusing and diffracting which is caused by peaks which have average heights of two-millionths of an inch. However, even where the peaks on the surface 106 have average heights of five-millionths of an inch, enough of the light that is reflected from that surface will tend to move parallel to the angle of reflection to enable that light to form a dim beam of light 152 of circular cross section, as shown particularly by FIG. 10. The diffused and scattered light from the surface 106 will form an elongated pattern 154 which extends outwardly from the opposite sides of the dim beam of light 152, as shown particularly by FIG. 10. The light-sensitive element 108 will essentially "see" only the dim beam 152, the light-sensitive element 110 will "see" the portion of the elongated pattern 154 which is immediately adjacent the left-hand side of that dim beam, the light-sensitive element 112 will "see" the portion of the elongated pattern 154 which is disposed to the left of that portion of that elongated pattern which is "seen" by the light-sensitive element 112, and the light-sensitive element 114 will "see" the portion of the elongated pattern 154 which is disposed to the left of that portion of that elongated pattern which is "seen" by the light-sensitive element 112.

If the surface 106 is a one-directional lay surface, and if the peaks on that surface have average heights in the range of ten-millionths of an inch, the diffusing and diffracting of the light which is caused by those peaks will be greater than the diffusing and diffracting which is caused by peaks which have average heights of five-millionths of an inch. The diffusing and diffracting caused by peaks having average heights in the range of ten-millionths of an inch is so great that the amount of light which moves parallel to the angle of reflection will be too small to develop a perceptible beam of light. Instead, the light leaving the surface 107 will be so diffused and diffracted that it will form the elongated pattern 156 shown by FIG. 11. The light-sensitive element 108 will essentially "see" the center of the elongated pattern 156, the light-sensitive element 110 will "see" the portion of the elongated pattern 156 which is disposed to the left of that portion of that elongated pattern which is seen by the light-sensitive element 108, the light-sensitive element 112 will "see" the portion of the elongated pattern 156 which is disposed to the left of that portion of that elongated pattern which is seen by the light-sensitive element 110, and the light-sensitive element 114, will "see" the portion of the elongated pattern 156 which is disposed to the left of that portion of that elongated pattern which is seen by the light-sensitive element 112.

The electrical components 82 and the adjustable potentiometers 84 will be suitably incorporated into the circuit, which is shown in conceptual form in FIG. 7, to determine the effective sensitivities of the light-sensitive elements 108, 110, 112 and 114. The values of those electrical components will be selected, and the values of those adjustable potentiometers will be adjusted, so the light-sensitive elements 108 and 110 will be able to accept the maximum strength beam of light reflected from the surface 106, so the effective sensitivities of the light-sensitive elements 108 and 110 will be equal, and so the effective sensitivities of the light-sensitive elements 112 and 114 will be about 25 db. higher than the effective sensitivities of the light-sensitive elements 108 and 110.

The meter 144 has three scales, not shown, and the uppermost scale has 0.05 at the left-hand end thereof and has 0 at the right-hand end thereof, the middle scale has 0.14 at the left-hand end thereof and has 0.04 at the right-hand end thereof, and the lowermost scale has 4,5 at the left-hand end thereof and has 0.1 at the right-hand end thereof. The pointer of the meter 144 is adjacent the left-hand ends of the three scales whenever that meter is deenergized; and that pointer will move toward the right-hand ends of those scales whenever that meter is energized. The uppermost scale on the meter 144 is used whenever the movable contact 138 of switch 130 is in engagement with the lowermost fixed contact 136, the middle scale of that meter is used whenever that movable contact is in engagement with the middle fixed contact 134; and the lowermost scale of that meter is used whenever that movable contact is in engagement with the uppermost fixed contact 132.

Where, as shown by FIG. 9, the major part of the light which is directed against the surface 106 is reflected in the form of a narrow light beam 148 of circular cross section, the amount of light which reaches the light-sensitive element 108 will be very high compared to the amount of light which reaches the light-sensitive element 110; and the amount of light which reaches the light-sensitive element 110 will be higher than the amount of light which reaches the light-sensitive element 112 and still higher than the amount of light which reaches the light-sensitive element 114. However where, as shown by FIG. 10, less light is reflected so it is parallel to the angle of reflection, the amounts of light which reach the light-sensitive elements 110, 112 and 114 will be higher relative to the amount of light which reaches the light-sensitive element 108 than was the case when the peaks on the surface 106 had average heights of only two-millionths of an inch. Where even less light is reflected so it is parallel to the angle of reflection, as shown by FIG. 11, the amounts of light which reach the light-sensitive elements 110, 112 and 114 will be still higher relative to the amounts of light which reach the light-sensitive element 108 than was the case when the peaks on the surface 106 had average heights of two-millionths of an inch. The amount of diffusion and diffraction which the peaks on the surface 106 will cause will be a function of the inclinations of the slopes of those peaks, and those inclinations will be functions of the heights of those peaks; and hence the amount of diffusion and diffraction of the light by the peaks on a relatively smooth surface will be a measure of the heights of those peaks. This means that the angular distribution of the light reflected from a surface can be used to provide a measure of the roughness of that surface. If the Greek letter $\eta$ is considered to represent the root mean square of the angular distribution of light, reflected from a surface, which is due to roughness of that surface, if the letter $h$ is considered to represent the root mean square of the average height of the peaks on that surface, and if the letter L is considered to be the root mean square of the distances between those peaks, then:

$$\eta = \sqrt{2 \frac{h}{L}}$$

Because the light-sensitive elements 108, 110, 112 and 114 have finite, albeit small, diameters, those light-sensitive elements provide an effect which approximates the effect which a coarse screen averaging would provide. Since a coarse screen averaging tends to make the significance of the factor $L$ in the immediately preceding equation less than the significance of the factor $h$ in that equation, the parameter $\eta$ essentially becomes a dimensionless parameter which is primarily proportional to the root mean square of the average height of the peaks on a surface but secondarily is inversely proportional to the root mean square of the distances between those peaks. Although the parameter $\eta$ is dimensionless, it is believed to provide as much, or more, information about the roughness of a relatively smooth surface than does the customarily used parameter of the average height of the peaks on the surface being tested. For example, a test that depended wholly upon the customarily used parameter of the heights of the peaks on the surface being tested would indicate that two surfaces, which had peaks of the same heights, had the same degree of roughness—even if the peaks on one of those surfaces were very close together while the peaks on the other of those two surfaces were guide far apart. In contrast, a test which utilized the parameter $\eta$ would readily distinguish between those two surfaces.

In using the roughness-measuring device provided by the present invention, that device will be placed on a surface 106, the light source 90 will be energized by closing a switch, not shown, and the movable contact 138 of the switch 130 will be set in engagement with the fixed contact 132. The knob 52 will then rotated until a minimum reading is attained on the lowermost scale of the meter 144. If that reading is 30 percent or more of full scale, as that scale is read from right to left, that reading should be considered to be the $\eta$ value of the surface being tested. However, if the reading on the lowermost scale is less than 30 percent of full scale, as that scale is read from right to left, the movable contact 138 of the switch 130 should be shifted into engagement with the fixed contact 134, and then the reading on the middle scale should be noted. If the reading on the middle scale is 20 percent or more of full scale, as that scale is read from right to left, that reading should be considered to be the $\eta$ value of the surface being tested. However, if the reading on the middle scale is less than 20 percent of full scale, as that scale is read from right to left, the movable contact 138 of the switch 130 should be shifted into engagement with the fixed contact 136; and then the reading on the uppermost scale should be considered to be the $\eta$ value of the surface being tested. At the completion of each test, the movable contact 138 of the switch 130 should be shifted back into engagement with the fixed contact 132 of that switch.

Whenever the movable contact 138 of the switch 130 is shifted into engagement with the fixed contact 132, the log amplifier minor will amplify the signal developed by the light-sensitive element 114 while the log amplifier 128 will amplify the signal developed by the light-sensitive element 108. The differential amplifier 142 will respond to the differences between the output signals of log amplifier 128 and of log amplifier 140 to provide a signal which will drive the meter 144. If the roughness-measuring device is resting on a surface 106 which has peaks with average heights in the range of two-millionths of an inch, the major part of the light reflected from that surface will be in the form of a beam of light 148 and only a minor part of that light will bee in the form of an elongated pattern 150, all as shown by FIG. 9. In that event, the amount of light which reaches the light-sensitive element 108 will be much greater than the amount of light which reaches the light-sensitive element 114. However, because the effective sensitivity of the light-sensitive element 114 is about 25 db. greater than the effective sensitivity of the light-sensitive element 108, the signal at the output of the log amplifier 140 will be larger than the signal at the output of the log amplifier 128. The differential amplifier 142 will respond to the difference between those signals to drive the pointer of the meter 144 close to the right-hand end of the lowermost scale. The reading on that scale will be less than 30 percent of full scale, as that scale is read from right to left; and hence the movable contact 138 of the switch 130 will be shifted downwardly out of engagement with fixed contact 132 and into engagement with fixed contact 134.

As the movable contact 138 is shifted out of engagement with the fixed contact 132 and into engagement with the fixed contact 134, the upper input of the log amplifier 140 will be disconnected from the light-sensitive element 114 and will be connected to the light-sensitive element 112. At this time, the log amplifier 140 will amplify the signal developed by the light-sensitive element 112 while the log amplifier 128 will amplify the signal developed by the light-sensitive element 108. Although the amount of light which reaches the light-sensitive element 108 will be much greater than the amount of light which reaches the light-sensitive element 112, the effective sensitivity of the light-sensitive element 112 will be so much greater than the effective sensitivity of the light-sensitive element that the signal at the output of the log amplifier 140 will be greater than the signal at the output of the log amplifier 128. The differential amplifier 142 will respond to the difference between those signals to drive the pointer of the meter 144 close to the right-hand end of the middle scale. The reading on that scale will be less than 20 percent of full scale, as that scale is read from right to left; and hence the movable contact 138 of the switch 130 will be shifted downwardly out of engagement with fixed contact 134 and into engagement with fixed contact 136.

As the removable contact 138 is shifted out of engagement with the fixed contact 134 and into engagement with the fixed contact 136, the upper input of the log amplifier 140 will be disconnected from the light-sensitive element 112 and will be connected to the light-sensitive element 110. At this time, the log amplifier 140 will amplify the signal developed by the light-sensitive element 110 while the log amplifier 128 will amplify the signal developed by the light-sensitive element 108. The difference between the signals at the outputs of the log amplifiers 128 and 140 will be fairly large; and the differential amplifier 142 will respond to those signals to drive the indicator of the meter 144 close to the right-hand end of the uppermost scale. Where the surface 106 has peaks with average heights in the range of two-millionths of an inch, the reading on the uppermost scale of the meter 144 will be very close to zero. Once the reading on the uppermost scale of the meter 144 has been noted and recorded, the movable contact 138 of the switch 130 will be shifted back into engagement with the uppermost fixed contact 132.

If the roughness-measuring device is resting on a surface 106 which has peaks with average heights in the range of three-millionths of an inch, the light which is reflected from that surface will develop a pattern which is very similar to that shown by FIG. 9. The movable contact 138 of the switch 130 will be shifted out of engagement with the fixed contact 132 and into engagement with the fixed contact 134, and then will be shifted out of engagement with the fixed contact 134 and into engagement with the fixed contact 136. Thereupon, the reading on the uppermost scale of meter 144 will indicate an $\eta$ value of 0.009. Once the reading on the uppermost scale of the meter 144 has been noted and recorded, the movable contact 138 of the switch 130 will be shifted back into engagement with the uppermost fixed contact 132.

If the roughness-measuring device is resting on a surface 106 which has peaks with average heights in the range of five-millionths of an inch, the light which is reflected from that surface will develop a pattern which is very similar to that shown by FIG. 10. The movable contact 138 of the switch 130 will be shifted out of engagement with the fixed contact 132 and into engagement with the fixed contact 134, and then will be shifted out of engagement with the fixed contact 134 and into engagement with the fixed contact 136. Thereupon, the reading on the uppermost scale of meter 144 will indicate an $\eta$ value greater than 0.01. Once the reading on the uppermost scale of the meter 144 has been noted and recorded, the movable contact 138 of the switch 130 will be shifted back into engagement with the uppermost fixed contact 132.

If the roughness-measuring device is resting on a surface 106 which has peaks with average heights in the range of ten-millionths of an inch, the light which is reflected from that surface will develop a pattern which is very similar to that shown by FIG. 11. The movable contact 138 of the switch 130 will be shifted out of engagement with the fixed contact 132 and into engagement with the fixed contact 134. Thereupon the reading on the middle scale of meter 144 will indicate an $\eta$ value slightly smaller than 0.05. Once the reading on the uppermost scale of the meter 144 has been noted and recorded, the movable contact 138 of the switch 130 will be shifted back into engagement with the uppermost fixed contact 132.

If the roughness-measuring device is resting on a surface 106 which has peaks with average heights in the range of eleven-millionths of an inch the light which is reflected from that surface will develop a pattern which is very similar to that shown by FIG. 11. The movable contact 138 of the switch 130 will be shifted out of engagement with the fixed contact 132 and into engagement with the fixed contact 134. Thereupon, the reading on the middle scale of meter 144 will indicate an $\eta$ value of about 0.055. Once the reading on the middle scale of the meter 144 has been noted and recorded, the movable contact 138 of the switch 130 will be shifted back into engagement with the uppermost fixed contact 132.

If the roughness-measuring device is resting on a surface 106 which has peaks with average heights in the range of thirteen-millionths of an inch the light which is reflected from that surface will develop a pattern which is very similar to that shown by FIG. 11. The movable contact 138 of the switch 130 will be shifted out of engagement with the fixed contact 132 and into engagement with the fixed contact 134. Thereupon, the reading on the middle scale of meter 144 will indicate an $\eta$ value of about 0.11. Once the reading on the middle scale of the meter 144 has been noted and recorded, the movable contact 138 of the switch 130 will be shifted back into engagement with the uppermost fixed contact 132.

The surfaces of objects and devices which have been ground will usually be one-directional lay surfaces; and light that is reflected from such surfaces will form elongated patterns which match or resemble the patterns shown by FIGS. 9, 10 and 11. Similarly, the surfaces of objects and devices that have been lapped will be one-directional lay surfaces. However, the surfaces of objects and devices can be formed so they will not be one-directional lay surfaces. For example, the surfaces of objects and devices can be formed so they will have circular patterns developed on them. In measuring the roughness of surfaces which have circular patterns developed on them, it will usually be desirable to set the roughness-measuring device at different positions on those surfaces; and, each time that roughness-measuring device is set at a different position on such a surface, the movable contact 138 of the switch 130 should be set in engagement with fixed contact 132, and then the knob 52 should be rotated until a minimum reading is noted on the lowermost scale of the meter 144.

The parameter $\eta$ should be of real value to operators of grinding, lapping and polishing machines. That parameter is believed to provide a better indication of the roughness of a surface than can any known parameter. Further, the roughness-measuring device which measures that parameter does not mar, deface, or degrade the surface on which it is set.

FIG. 12 is a graph wherein the ordinates represent the intensities of light falling upon light-sensitive elements set at various angles of reflection relative to a surface, the abscissas represent the squares of those angles of reflection, and the heavy lines represent values of $\eta$ corresponding to differing degrees of roughness of that surface. The heavy line 160 represents an $\eta$ value of 0.009. That line was plotted from data obtained by use of the equation $$\eta = \sqrt{2\frac{h}{L}}$$

where $h$ was assumed to be three-millionths of an inch; but measurements made with the roughness-measuring device of the present invention on a surface having peaks with average heights of three-millionths of an inch closely conform to that line. The heave line 162 represents an $\eta$ value of 0.055; and the heavy line 164 represents an $\eta$ value of 0.11. The lines 162 and 164 were plotted from data obtained by use of the said equation where $h$ was assumed to be eleven-millionths of an inch and thirteen-millionths of an inch, respectively; but measurements made with the roughness-measuring device on surfaces having peaks with such heights closely conform to those lines.

The angles between the light-sensitive elements 114, 112, 110 and 108 and a line which is perpendicular to the surface to be measured can be varied. However, the angle between the light-sensitive element 114 and that line should be considerably smaller than 50°. Also the angle between the light-sensitive element 108 and that lines should be less than 5°; and the angle between the light-sensitive element 110 and the light-sensitive element 108 should be as small as possible.

Where it is set on flat, one-directional lay surfaces, the roughness-measuring device of the present invention can measure the $\eta$ values of surfaces having average peak heights in the range of one-millionth of an inch to fifty-millionths of an inch. That roughness-measuring device will not mar, deface, or impair any of those surfaces in any way, that device can be used by relatively unskilled persons, and it will be much more accurate than any prior roughness-measuring device. The concept of measuring the parameter $\eta$ of one-directional lay surfaces can be extended to multidirectional lay surfaces by using different scales for the meter 144. Similarly, the concept of measuring the parameter $\eta$ of curved surfaces can be realized by using different scales for the meter 144 and by using an appropriate interpolative chart or table.

Where the light source 90 is very stable and emits a very large amount of light, it may be possible to eliminate the log amplifiers 128 and 140. The elimination of those log amplifiers would be desirable, because it would reduce the cost of the roughness-measuring device.

Whereas the drawing and accompanying description have shown and described a preferred embodiment of the present invention it should be apparent to those skilled in the art that various changes may be made in the form of the invention without affecting the scope thereof.

What we claim is:

1. A device for measuring the roughness of a surface which comprises:
    a source of light,
    an optical system which receives light from said source of light and directs said light at said surface at a predetermined angle of incidence,
    a first light-sensitive element disposed to receive light reflected from said surface at an angle of reflection substantially equal to said angle of incidence,
    a second light-sensitive element that is angularly spaced from said angle of reflection and that is disposed to receive light diffused and diffracted by said surface, and
    a circuit that senses the signals from said light-sensitive elements to compare said signals and to indicate a comparison of the signals as a measure of the roughness of said surface,
    a rotatable support positioned adjacent said surface,
    said source of light, said optical system, said first light-sensitive element, and said second light-sensitive element all being positioned in the same plane, and being fixedly mounted on and rotatable with said rotatable support,
    said rotatable support being rotatable about an axis which is normal to said surface to enable said first light-sensitive element and said second light-sensitive element to rotate about said axis,
    whereby said first light-sensitive element and said second light-sensitive element can be rotated as a unit relative to said surface about said axis.

2. A device for measuring the roughness of a surface which comprises:
    a source of light,
    an optical system which receives light from said source of light and directs said light at said surface at a predetermined angle of incidence,
    a first light-sensitive element disposed to receive light reflected from said surface at an angle of reflection substantially equal to said angle of incidence,
    a second light-sensitive element that is spaced from said angle of reflection and that is disposed to receive light diffused or diffracted by said surface, and
    a third light-sensitive element that is spaced from said angle of reflection and that also is spaced from said second light-sensitive element,
    a circuit that senses the signals from said light-sensitive elements to compare said signals and to indicate a comparison of the signals as a measure of the roughness of said surface, said circuit selectively sensing the signals from the said first light-sensitive element and said third light-sensitive element and from the said first light-sensitive element and said second light-sensitive element,
    said second light-sensitive element being spaced from the first said light-sensitive element an angular distance less than 5°,
    said third light-sensitive element being spaced from the first said light-sensitive element an angular distance greater than 5°.

3. The method of sensing the roughness of a surface which comprises:
    a. directing a beam of light toward an area of said surface at a predetermined incidence angle,
    b. sensing the amount of light which is reflected from said area of said surface at an angle of reflection that is substantially equal to said incidence angle and thereby sensing the amount of said area of said surface that is smooth,
    c. sensing the amount of light which is reflected, diffused and diffracted from said area of said surface at a first angle that is angularly spaced less than 5° from said angle of reflection and thereby sensing the amount of said area of said surface which has peaks of a first predetermined height,
    d. comparing the amount of light sensed at said angle of reflection with the amount of light sensed at said first angle to obtain an indication of the roughness of said area of said surface,
    e. sensing the amount of light which is reflected, diffused and diffracted from said area of said surface at a second angle that is angularly spaced greater than 5° from said angle of reflection and thereby sensing the amount of said area of said surface which has peaks of a second predetermined height, and
    f. comparing the amount of light sensed at said second angle with the amount of light sensed at said angle of reflection to obtain a further indication of the roughness of said area of said surface.